Figure 1:
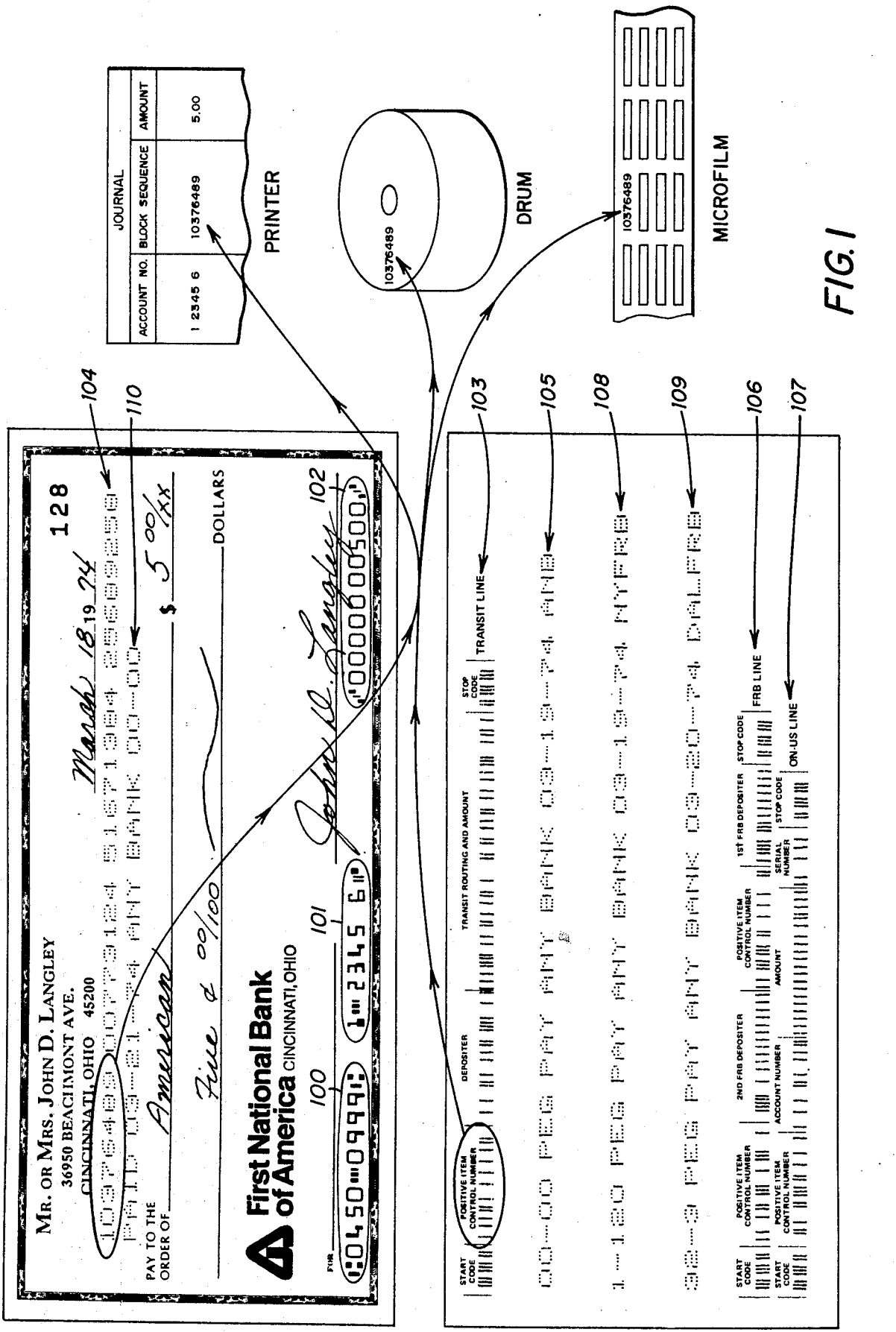

United States Patent
Blair et al.

[11] 3,988,571
[45] Oct. 26, 1976

[54] DOCUMENT REJECT REENTRY

[75] Inventors: James F. Blair, Dallas; Patricia L. Korn, Addison; Leonard J. Nunley, Dallas, all of Tex.

[73] Assignee: Recognition Equipment Incorporated, Irving, Tex.

[22] Filed: May 30, 1974

[21] Appl. No.: 474,525

[52] U.S. Cl. .................................. 235/61.9 R; 101/2
[51] Int. Cl.² ..................... G01D 15/18; G06K 7/10
[58] Field of Search ............... 235/61.9 R, 61.11 R, 235/61.11 D, 61.11 E, 61.11 A, 61.7 B, 153 AS; 209/74; 197/1 R; 340/172.5; 346/1; 101/DIG. 13, 2

[56] References Cited
UNITED STATES PATENTS

| | | | |
|---|---|---|---|
| 2,775,298 | 12/1956 | Rubidge et al. | 235/61.11 D |
| 3,052,350 | 9/1962 | Marcovitz | 209/74 |
| 3,087,612 | 4/1963 | Duncan et al. | 209/74 |
| 3,248,705 | 4/1966 | Dammann et al. | 340/172.5 |
| 3,470,357 | 9/1969 | Ritzerfeld | 235/61.11 |
| 3,698,002 | 10/1972 | Appel | 346/1 |
| 3,703,628 | 11/1972 | Philipson, Jr. | 235/61.9 R |
| 3,787,884 | 1/1974 | Demer | 346/75 |
| 3,833,795 | 9/1974 | Shoshani et al. | 235/61.9 R |

*Primary Examiner*—Vincent P. Canney
*Attorney, Agent, or Firm*—Richards, Harris and Medlock

[57] ABSTRACT

Automatic processing of a stream of financial documents involving members of a series of positive item control numbers sequentially encoded one per document in the stream with account-amount data machine read from each document and stored in reproducible form in the same order as the series of control numbers. Reentry of documents into the stream from a reject stack because of failure to read one or more characters in the account-amount field involves displaying in response to a call to storage in response to the control number for a rejected document characters preceding and following a character present but not read from a rejected document. An entry into storage of each character not read at positions corresponding to the character position on the document is manually produced. Rejected documents are then passed through an encoder to impress a bar code representative of said account-amount thereon under control of the corrected storage in response to the control number.

12 Claims, 2 Drawing Figures

DOCUMENT REJECT REENTRY

This invention relates to automatic processing of documents, or more particularly, to a method and system for the re-entry of reject documents in a stream of documents being automatically processed.

When in a first pass, there is failure to read all specified data on a document, data read from a rejected document is displayed to assist manual correction of the data in storage from such rejected document. The document is then encoded with all of the data that should have been read on the first pass.

In the processing of documents such as bank checks and the like by financial institutions, a data capture system is employed for capturing data from and sorting the document in dependance upon read information therefrom. In accordance with a system described and claimed in patent application Ser. No. 448,458, filed Mar. 6, 1974, for Trace Automated Processing of Financial Documents, now abandoned a system is disclosed wherein a Positive Item Control Number (PICN) is applied to each document as it enters the system. Documents are fed at a rate of from 1800 to 2400 items per minute to a read module. They are normally read both magnetically and optically. The two resultant data strings are then reduced to a single character string, using redundant data to reduce the number of rejects. The resultant data is stored in a suitable computer memory.

In the handling of bank checks normally an account number and an amount are printed thereon in MICR format. In such format the documents can be read at the above high rate. In the above application, the unique Positive Item Control Number (PICN) is applied not only to each document but also is applied to a memory unit for storage and retrieval along with the account number and the amount of the check. All documents also pass through an ink jet printer station as they travel from the MICR-OCR read station. The printer station is to apply bar codes to the back and alphanumerics to the face or the back of the document as an operator may desire. Such bar codes may include a block and sequence number, an account or transit number, an amount number, an out-pocket and sequence code, a transit code, a second pass pocket code and a third pass pocket code. Thereafter the processing can be undertaken by reading and utilizing the bar codes.

In accordance with this invention where a document is rejected by the system because of failure to read all of the information on the accound field and the amount field, the account-amount data information is not recorded on the document in the bar code. The account number and the amount of the check, as they are read, along with the Positive Item Control Number are entered into memory with a cursor or asterisk stored in memory at the point at which any digit is not read.

Reentry of rejected documents is performed in response to a call to memory storage based on the control number of a rejected document. A display is produced of characters preceding and following a character present on the document but not read. An entry is then made manually into storage to correct each character in the stored information that was not read. The manual entry is performed by reference to the document itself. Upon completion of reject correction of a block, reconciliation of all documents in the given block can be promptly performed. The reconciliation includes data from all documents in a block including the data involved in manual reentry wherein the data in storage is corrected.

Thereafter, the documents for which the memory data has been corrected are passed through the ink jet printer and the bar coded account and amount are applied to the document under control of the corrected memory information.

The method therefore comprises displaying characters preceding and following a character present but not read from the rejected document, in response to a call to storage based upon the control number for a rejected document. An entry into storage of each character not read at positions corresponding to the character position on said document is manually produced. Thereafter the rejected documents are passed through an encoder to impress a bar code representative of said account-amount thereon under control of the corrected storage.

Figure 2:
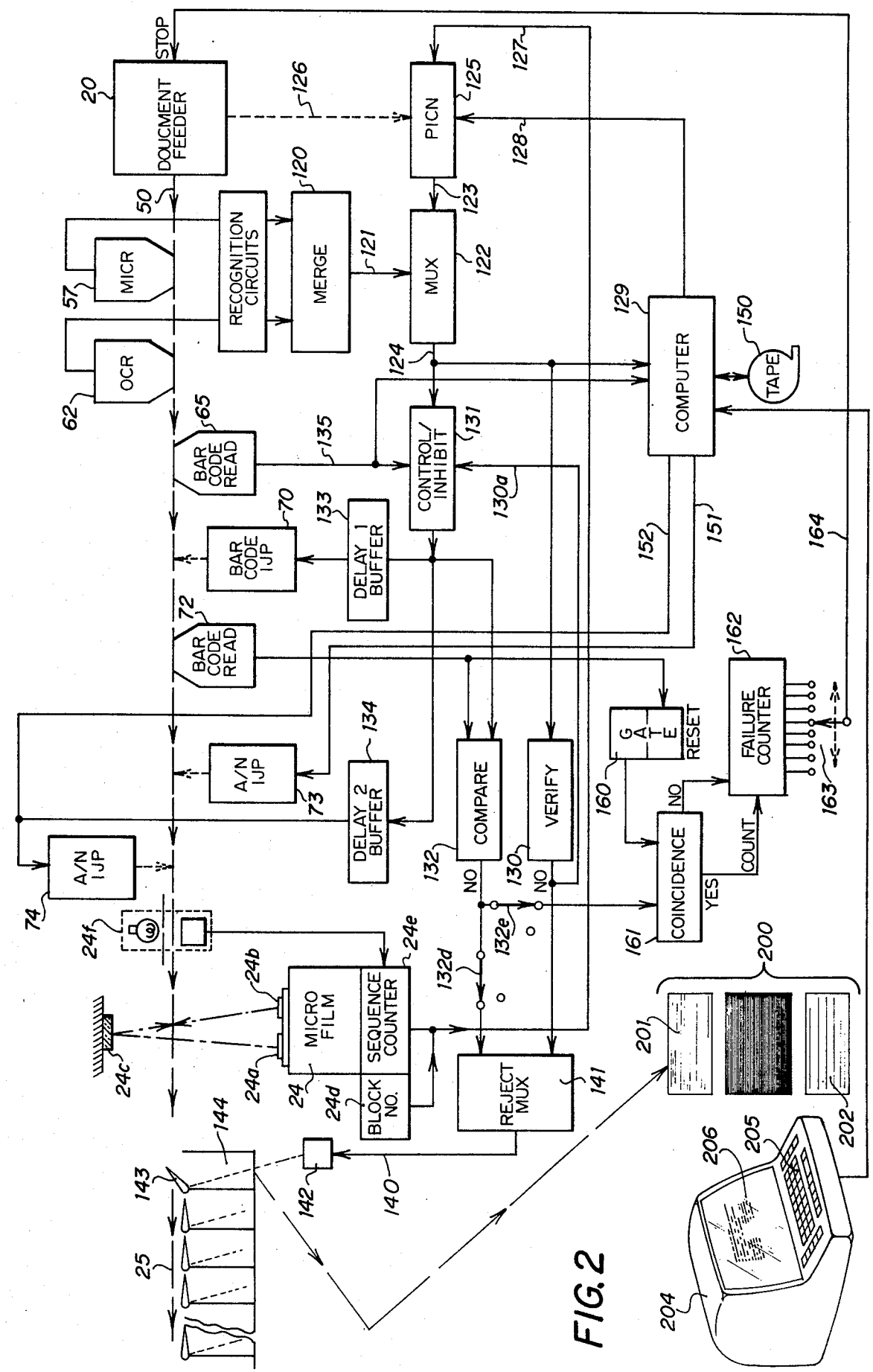

For a more complete understanding of the present invention and for further objects and advantages thereof, reference may now be had to the following description taken in conjunction with the accompanying drawings in which:

FIG. 1 illustrates a document process; and
FIG. 2 is a block diagram of a processing system utilized in the present invention.

Referring now to FIG. 1, the front and back of a bank check have been illustrated. The bottom line on the face of the document comprises three MICR fields 100–102. Lines 104 and 110 include additional informatin printed on the face of the check during processing. On the back of the check are lines 103 and 105–109. The example thus illustrated represents a fully processed check.

The first eight digits on line 104 is the unique PICN number, for positive item control, reflecting the item's relative sequence within a block of items being processed and relating directly to the microfilm frame number. A PICN is assigned as each item passes through the processing system. The PICN on line 104 is shown in ink jet printed form on the front of the item in alpha-numeric characters. The PICN is also encoded and printed in machine-readable bar code form on the back of the item as indicated in line 103.

The first MICR field 100 is coded to represent identity of a bank on which the check is drawn. The second field 101 is coded to represent the identity of the maker. Field 102 is a field in which the amount for which the check is drawn in encoded.

In operation as indicated in FIG. 1, information read from a check, namely the account-amount fields along with PICN is to be (1) entered on a journal ledger sheet; (2) stored serially on a disc or other memory; and (3) stored on a microfilm storage system.

The PICN is ink jet printed in bar code form on line 103 and in numeric form on line 104 to permit reconstructing an original sequence of input documents; to provide a positive match for hard core re-entry; to assist in investigation of errors or differences; and to provide a key for detection of replacement of free and missing items. Before further discussing re-entry of rejected documents, the processing system will first be briefly described.

FIG. 2

A system which involves the present invention is shown in FIG. 2. A document feeder 20 starts documents along their path beginning at point 50. A MICR read head 57, an OCR read head 62 and the alphanumeric ink jet gun 74 are associated with the face of the documents at successive downstream locations. A bar code reader 65, a bar code ink jet gun 70, a bar code reader-verifier 72, and an alphanumeric ink jet gun 73 are associated with the back of the documents at successive downstream locations. A microfilm camera 24 is adapted to record both the face as through a lens system 24a and a mirror 24b and the back by lens system 24c.

Output signals from the MIRC read head 57 and the OCR read head 62 are applied to a merge unit 120. In accordance with known techniques, the two inputs to merge unit 120 are employed to produce a single output data stream on a bus 121. Failure of MICR to identify each given character in fields 100–102 may thus be supplemented by use of the output from the OCR reader whereby the incidence of read failure is greatly reduced relative to systems which use either head 57 or an OCR reader 62 alone.

A channel 121 is connected to a multiplexer 122 in which the information on channel 121 and information on a channel 123 are combined to provide an output on channel 124 which includes the data on fields 100–102 combined with the PICN on channel 123. Channel 123 leads from a PICN generator 125. Generator 125 may be linked to the flow of documents from the feeder 20 as by way of a linkage 126. Preferably, however, the generation of PICN is correlated with the block number and the last four digits of the block sequence from counters 24d and 24e in the microfilm camera 24 as applied by a channel 127 from camera 124 to PICN generator 125. A sensor 24f is shown in relation to a sequence counter 24e to provide for generation of the PICN and to aid in operation of camera 24 and in use of the photographic record produced by camera 24. A channel 128 extends from a central computer 129 for synchronization purposes. Thus, the combination of the data from fields 100–102, FIG. 1, appears on the output channel 124 along with the PICN for the document from which such data is obtained.

Data on channel 124 is then applied to computer 129, to a verify unit 130 and to a control/inhibit unit 131. Unit 131 applies the same output to a comparison unit 132 and to delay buffers 133 and 134.

The output of a bar code reader 65 is applied by way of channel 135 to the control/inhibit unit 131 and to the computer 129. If the bar code reader 65 senses a bar code previously printed on line 103, FIG. 1, for example, it will inhibit bar code printer 70 and alphanumeric printer 74. If a document has not been previously encoded, then the data from the control/inhibit unit 131 will be applied by way of delay buffers 133 and 134 to the ink jet guns 70 and 74. Bar code reader 72 supplied a second input to the comparison unit 132. If the data from channel 124 is the same as that printed by the gun 70 and thereafter read from the document by reader 72, then the document may pass through to a sorter 25. However, if on comparison the imprinting on the document does not correspond with the input to the gun 70, then the output of the compare unit 132 is applied to a reject multiplexer 151 by way of selector switch 132d. The output of multiplexer 141 appears on channel 140 and is applied to control unit 142 to actuate a gate 143 which diverts the improperly or incompletely coded document into a reject bin 144.

The output of bar code reader 72 is connected to a gate 160 whose output is connected to one input of a coincidence circuit 161. The output of compare unit 132 is connected by way of switch 132e to the second input of coincidence circuit 161. The yes output of circuit 161 is connected to a failure counter 162. The no output of the coincidence circuit 161 is connected to the reset terminal of counter 162. The output of counter 162 may be selected by means of switch 163 to apply a stop control signal by way of line 164 to the document feeder. Gate 160 may be a monostable multivibrator that is gated on once upon appearance of each document at reader 72 and stays on for a period corresponding to the passage of the document past reader 72. It will be recalled that comparison unit 132 provides a true output when there is failure in the comparison between that which was applied to the printer 70 and that which is read by reader 72. The output of unit 132 may then be applied by way of switch 132e to the second input of coincidence unit 161.

Each time there is failure in the comparison unit 132, a pulse will be applied to counter 162, otherwise a reset pulse appears at the reset terminal of counter 162. By means of the switch 132e, gate 160, coincidence circuit 161, counter 162 and selector switch 163, the system can be shut down if a selected number of consecutive documents are not properly encoded by printer 72. In practice, the systems have been operated to shut down when five consecutive documents are not properly imprinted by printer 70.

The switch 132d also permits selection of the function of sorting to a reject bin 144 every document which fails to meet the test of comparison unit 132. Either or both of the functions provided by switches 132d and 132e may be employed. In some operations, it has been found to be more economical to sort and re-enter documents not properly imprinted by the printer 65 at a stage later than the first pass in the system. When both switches 132d and 132e are conductive, rejects are sorted into bin 144 and the system will be shut down if more than the number allowed by the selected output appear in succession.

In accordance with the invention, data on channel 124 is applied to verify unit 130. This provides a check to make certain that all of the characters appearing in field 100–102 are successully identified. If any character is not identified in a block where data is known to exist, then the reject unit 141 is actuated to divert the document to the bin 144. It will be noted that in such case, codes for all character fields not completely read and identified appear on bus 124 and are inhibited from buffers 133 and 134 and guns 70 and 74 to avoid ink jet printing the account-amount on the document on its first pass through the system. However, the PICN is bar code printed on every document in the first pass as it appears on lines 103 and 104, FIG. 1. Such partially coded documents are then correlated with the record applied to a tape unit 150 by computer 129. Complete encoding of the document ultimately is completed on lines 103 and 104 in response to corrected data stored in tape unit 150. A record including corrections is stored by tape unit 150.

A channel 151 extends from computer 129 to provide for actuation of gun 73 when and if it is desired to endorse a train of checks as by imprinting on one of lines 105, 108 or 109, FIG. 1. A channel 152 extends to gun 74 to provide for cancellation by printing as on line 110, FIG. 1.

From the foregoing it will be understood that the system illustrated in FIG. 2 may be used for first pass operations wherein the information is initially captured by bar code imprinting on line 103, FIG. 1, and the PICN is applied to the face of the document as on line 104, FIG. 1, as well as for the correction operations precedent to reentry.

Control of the system will be understood generally to correspond to systems currently in use involving operations of a system of Recognition Equipment Inc. of Dallas, Texas, known as "Input 80" wherein alphanumeric information is captured by an optical reader and employed in accounting operations and operations described in U.S. Pat. No. 3,703,628 wherein bar codes are printed on traveling documents and sorting operations subsequently are carried out based on the applied bar codes. Preferably the ink employed herein will be fluorescent so that bar codes applied over prior printed matter such as stamped or printed endorsements may be distinguished and read by readers 65 and 72.

Control of sorting and tracking documents preferably will be carried out in accordance with the known methods and systems. A suitable system is described and claimed in U.S. Pat. No. 3,815,102 entitled "Method and Apparatus For Item Tracking". In general, document tracking and sorting is well known and thus has not been further detailed herein. Another suitable method of document sorting is described in U.S. Pat. No. 3,460,673 entitled "Document Sorting Apparatus".

Discrete elements have been shown in the control system in FIG. 2. For example, the multiplexer 122, the control/inhibit unit 131, delay buffers 133 and 134, comparison units 132, verify units 133, gate 160, coincidence unit 161 and counter 162 are shown. It will be appreciated that these units, as well as others, may be implemented through the use of software in connection with operation of computer 129. However, they have been separately shown in FIG. 2 in order that their functions may more readily be understood.

The necessity for accurately reading on the first pass of the informatin contained in the account-amount fields is apparent. Where any character in the account-amount field is not read during the first operation of the system in accordance with the present invention, the bar code printer that would apply the bar codes on line 103, FIG. 1, is disabled by an inhibit signal on line 130a leading to inhibit unit 131. The signal on line 130a prevents printing the account-amount, but allows printing the PICN. Such documents are delivered to reject bin 144. Data stored in memory, tape 150, from the initial capture pass contains the PICN and account-amount data with reject characters or reject fields therein flagged.

The stack 200 of first pass reject documents are removed from the reject pocket 144 utilized to aid reentry operations. More particularly, an operator through a keyboard-display unit of a manual data entry system 204 calls up a block or part of a block of data stored on tape 150 by keying into the keyboard 205 the starting and ending PICN which is printed on the first item 201 and the last item 202 in the reject stack 200. For this purpose, the contents of tape 150 are dumped onto a storage disc which is inserted into system 204. The reject records are then displayed on a screen 206. The successive displays are called up in the order of the PICN on the reject documents. Each time the operator has matched a PICN from a document in stack 200 with a PICN displayed on screen 206, he inspects the document 201 to identify each reject character. A cursor that was generated by merge unit 120 for each character not read correctly and stored on tape 150 appears on screen 206 in association with preceding and following characters in the series. The operator manually enters into the storage disc in system 204 through keyboard 205 the correct characters while viewing the top rejected document 201. When the stack of rejects 200 have been corrected in a buffer operation, the data is written back into its proper location in memory, tape 150.

When a block of reject records is completed, a master list can immediately be printed for reconciliation with all of the reject items flagged. This permits the system immediately to continue its accounting processing.

Thereafter, reject documents are again entered at point 50, FIG. 2, into the capture system and repassed for repair. The document has the account-amount bar code printed on the back on line 103. As each rejected document is passed, the PICN is read by a bar code reader and its corrected data is extracted from a storage buffer and ink jet printed onto the rejected items. The documents are then sorted to the appropriate pockets in sorter 25.

The overall processing operation will now be described briefly to place the above operation in perspective.

The ink jet printer 70 is employed at the first bank to which the check is presented to record necessary transit information on the top line 103 on the back of the document. Line 103 includes bar encoded fields including a start code, PICN, the depositer identification, a transit routing and amount and a stop code. Line 103 is coded by the first commercial or Federal Reserve Bank with a suitable system. The bank tests for the presence of bars in the transit routing field. If there are no bars and the bank testing is a commercial bank, they encode the entire top line to include their PICN, their depositor, transit routing and item amount. If the one testing is a Federal Reserve Bank, they encode only transit routing and amount. At the same time, an alphanumeric printer applies the PICN on line 104 on the face of the document. An alphanumeric printer may be employed to endorse the check on line 105 on the back indicating that "any bank" is to be paid. The document is then sorted based upon the transit routing code on line 103.

All checks in the first bank sorted and routed to a first Federal Reserve Bank bin would, upon receipt, be read by a reader corresponding to reader 65. The Federal Reserve Bank with a suitable system tests for the presence of bars in the first Federal Reserve Bank field of line 106. If there are none, they encode their unique PICN and their depositor. If bars are present in the first field, they encode the second Federal Reserve Bank field. The Federal Reserve Bank also tests the transit routing field on the first line 103. If there are no bars, they encode only the transit routing and amount in line 103.

In the present example there would be no data in such field. Thus, the first Federal Reserve Bank would apply on line 106 its code in the first FRB depositor field along with the PICN. The first Federal Reserve Bank would endorse the check on line 108 to the second Federal Reserve Bank. The second Federal Reserve Bank would endorse the check on line 109 to the on-us bank.

Checks are sorted by the second FRB for transmission to the banks on which the checks are drawn. The on-us bank tests the MICR encoded transit routing in field 100, FIG. 1, to determine if the item is drawn on them. They encode on line 107 their unique PICN and on-us data such as account number, amount (if not on top line), transaction code and serial number. The on-us bank would then cancel the check by printing the notation indicated on line 110 on the face of the check.

In connection with the initial pass and each of the succeeding transactions, the encoded data is read into an accounting system in order that bookkeeping operations for each institution through which the document passes can be carried out under automated control and in accordance with established and well known principles.

Computer 129 is illustrated as interfacing the entry system 204. A separate computer in system 204 is employed for operating under control of the keyboard 205. In one embodiment, system 204 was of the type manufactured and sold by ENTREX Incorporated of Burlington, Mass., and identefed as Model No. 481-1 comprising a mini CPU, a disk, a tape, a CRT and keyboard. To this may be added up to nineteen additional consoles such as console 205-206 simultaneously to engage in making corrections to data stored on first pass on tape 150 and transferred to a storage disk in system 204. In this system, computer 129 was of the type manufactured and sold by Data Craft Corp. of Fort Lauderdale, Florida and identified as Model No. 6024-5.

The example illustrated in the drawings and described above represents one specific system and mode of carrying out the invention. It has been found that in some applications the PICN will comprise more than eight characters. In some operations PICN of eleven characters has been used.

Having described the invention in connection with certain specific embodiments thereof, it is to be understood that further modifications may now suggest themselves to those skilled in the art and it is intended to cover such modifications as fall within the scope of the appended claims.

What is claimed is:

1. In a document sorter-processor where a high speed transport moves a train of documents through an alphanumeric character reader means and a first ink jet printer to addresses in a family of destinations selected on the basis of data read from each said document by said reader means and wherein means connected between said reader means and said printer actuates said printer to imprint on each said document a bar coded representation of signals from said reader means along with one unique positive item control number from a sequentially ordered set of numbers, the combination comprising:
   a. a second ink jet printer through which said train passes to print data on the faces of said documents,
   b. means to inhibit said first printer in response to error in reading account-amount data to each said document,
   c. means to store for retrieval the control number for each document along with account-amount data from each said document in a retrievable storage means,
   d. means to supply in said account-amount data an error symbol for each character not identified in any account-amount field, and
   e. means to correct said symbol in storage.

2. The system according to claim 1 wherein the means to correct said symbol comprises a visual display and means responsive to manual entry of the positive item control number to display the positive control number and the account-amount data from storage on said display.

3. The combination set forth in claim 1 including means responsive to the data read for delivering to a reject/sort bin all documents in which there is error in reading the account-amount data from the document.

4. The combination set forth in claim 2 wherein means are provided responsive to corrected data in storage for actuating said first printer to print the account-amount data on the document to which the corrected data pertain.

5. The combination of claim 1 wherein said second printer is an alphanumeric printer positioned on the side of said train opposite said first printer.

6. The combination set forth in claim 1 wherein said first printer is a bar code printer and said second printer is an alphanumeric printer.

7. An automated processing system for bank checks with magnetic ink alphanumeric account-amount data printed along a line on the face of each check, comprising:
   a. means for transporting said checks serially at constant velocity through a processor to a sorter,
   b. means for generating an item control number unique to each said document,
   c. at a first station in said processor means for sensing each character in said line to produce a string of account-amount data signals from each document with an error marker in said string at the location of any character present but not read from said document,
   d. at a second station in said processor:
      i. means for printing said control number on each document in human readable form, and
      ii. means for printing said control number on each document in machine readable form, and
   e. means to store in retrievable form the control number along with the account-amount data including each said marker in location.

8. The system of claim 7 in which print means at a station intermediate said first and second stations prints at a selected site on each said document a bar code of said account-amount data read from said document and means to inhibit said print means to prevent printing any account-amount data containing one of saiu markers.

9. Automated processing system of claim 7 in which said means for printing said control number includes means for printing at least part of said data string on the back of each said document in bar code form and at least said control number on the face of each document in human readable form.

10. In automatic processing of a stream of financial documents wherein members of a series of positive item control numbers sequentially are encoded in human readable form as well as machine readable form one such number per document in said stream and wherein account-amount data is machine read from each said document and stored in reproducible form in the same order as said series of control numbers, the method of reentry of documents into said stream which are relegated to a reject stack because of failure to read one or more characters in the account-amount field, comprising:

a. displaying in response to a call to storage and in response to said control number for a rejected document characters preceding and following a character present but not read from said rejected document, b. manually producing an entry into storage of each character not read at positions corresponding to the character position on said document, c. reading the control number on a rejected document for addressing corrected storage at a read control number, and d. printing a bar code representative of said account number thereon under control of a corrected storage.

11. In automatic processing of a stream of financial documents wherein members of a series of positive item control numbers seuqentially are encoded in human readable form as well as machine readable from one such number per document in said stream and wherein account-amount data is machine read from each said document and stored in reproducible form in the same order as said series of control numbers, the method of reentry of documents into said stream which are relegated to a reject stack because of failure to read one or more characters in the account-amount field, comprising:

a. displaying in reponse to addressing storage through said control number for a rejected document a string of characters preceding and following each marker signifying a character present but not read from said rejected document, b. manually producing an entry into storage of each character not read at positions corresponding to said marker, c. reading the control number on a rejected document for addressing corrected storage at a read control number, and d. printing a bar code representative of said account number thereon under control of the corrected storage.

12. The method of processing financial documents wherein a document sorter-processor moves a high speed train of documents through an alphanumeric character reader and a first ink jet printer to addresses in a family of destinations selected on the basis of data read from each document by said reader means and wherein means connected between said reader means and said printer actuate said printer to imprint on each said document a coded representation of signals from said reader means, the method which comprises:

a. printing on each said document as it passes through said system a positive item control number, each number being unique to a given document, b. entering the positive item control number printed on the given document in retrievable storage means along with the account-amount data read from the document, c. delivering all documents to a reject bin for which any error is encountered in the reading account-amount data from a document while entering a special marker indicating the point in any sequence of data that an error occurs in said account-amount data in storage, d. retrieving from storage on the basis of the positive item control number characters preceding and following each special marker and displaying the same in the sequence in which they were read from the document to signify the point of error, and e. entering a correction into storage to cause the display to correspond with the data actually on each document so that reconciliation of account-amount can be undertaken immediately upon correction of the storage of data from all reject documents in a given block of documents.

* * * * *